(12) United States Patent
Edwards et al.

(10) Patent No.: US 10,223,596 B1
(45) Date of Patent: Mar. 5, 2019

(54) IDENTIFYING VEHICLES IN A PARKING BAY

(71) Applicant: AMAZON TECHNOLOGIES, INC., Seattle, WA (US)

(72) Inventors: Alexander Edwards, Brisbane (AU); Jon Robert Ducrou, West End (AU); Tony Li, Brisbane (AU); Sheng-Wei Lin, Sunnybank (AU); Lev Zelenskiy, Bundall (AU)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 15/459,461

(22) Filed: Mar. 15, 2017

(51) Int. Cl.
*G06K 9/00* (2006.01)
*G06Q 30/06* (2012.01)
*G06K 9/46* (2006.01)

(52) U.S. Cl.
CPC ....... *G06K 9/00771* (2013.01); *G06K 9/4604* (2013.01); *G06Q 30/0633* (2013.01); *G06K 2209/15* (2013.01)

(58) Field of Classification Search
None
See application file for complete search history.

(56) References Cited

U.S. PATENT DOCUMENTS

| 2008/0029595 | A1* | 2/2008 | Waller | G06Q 10/087 235/383 |
| 2012/0106781 | A1* | 5/2012 | Kozitsky | G06Q 10/087 382/103 |
| 2013/0204719 | A1* | 8/2013 | Burry | G06Q 50/12 705/15 |
| 2016/0148300 | A1* | 5/2016 | Carr | G06Q 30/0633 705/26.8 |
| 2017/0330460 | A1* | 11/2017 | Massey | G08G 1/149 |

\* cited by examiner

*Primary Examiner* — Vu Le
*Assistant Examiner* — Tracy Mangialaschi
(74) *Attorney, Agent, or Firm* — Kilpatrick Townsend & Stockton LLP

(57) ABSTRACT

Systems and associated methods are disclosed to reduce wait time experienced by customers during order fulfillment and pick-up. The system utilizes cameras and automatic license plate recognition (ALPR) to quickly identify vehicles associated with customer accounts and pending pick-up orders upon arrival. Proximity detectors provide an additional layer of vehicle detection. A concierge tool provides manual inputs from a user relating to vehicle or customer status. The system provides for synthesis and fusion of these diverse input types to accurately detect and identify arriving and departing customers.

18 Claims, 11 Drawing Sheets

IDENTIFYING VEHICLES IN A PARKING BAY

BACKGROUND

Order pick-up locations provide a service to customers by enabling the customer to pick-up or otherwise receive orders of physical items such as groceries and goods. Typically, a customer will place an order for items remotely (e.g., using a website or an application) and will subsequently arrive at the order pick-up location to receive the physical items in the order. Because competition amongst order pick-up service providers is increasing, service providers must find ways in which to improve the service experience for customers. One aspect of the service experience is the amount of time a customer must wait at the order pick-up location before receiving his or her order. By reducing the duration of the wait time, the overall service experience, as well as customer throughput, should improve, thereby setting the particular service provider apart from others in the market.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Figure 1:
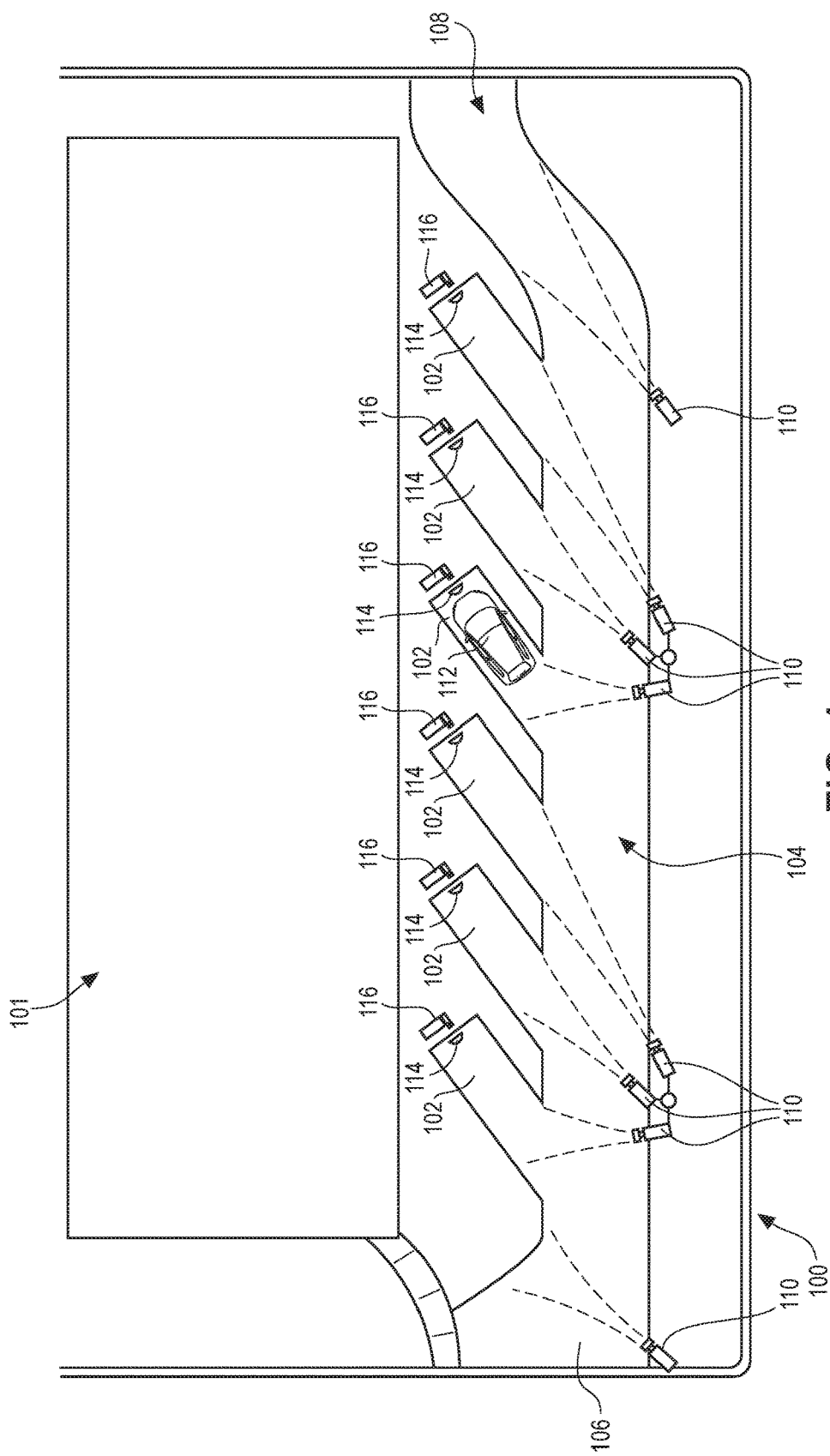
FIG. 1 is a diagram of an example pick-up location site configured in accordance with various embodiments.

In example embodiments described herein, methods and associated systems are disclosed to reduce the wait time experienced by customers during order fulfillment and pick-up. In certain embodiments, an order pick-up location is populated with one or more cameras configured to capture images of the license plate of vehicles entering or parked within an order pick-up parking bay. The captured images are processed using automatic license plate recognition (ALPR) technology to read the license plate on the vehicle. A server includes a customer identification module to determine whether the license plate matches any previously stored license plates corresponding to customers within a customer database. If so, the customer identification module also determines whether the identified customer has any pending pick-up orders. If so, the customer identification module automatically checks in the vehicle in the parking bay for pick-up of the pending pick-up order.

By automatically checking in the vehicle upon entering the parking bay, the step of manually checking in the vehicle by a human (e.g., a concierge) can be eliminated, thereby reducing the amount of time before the pick-up order fulfillment or delivery process can begin. By beginning the pick-up order delivery process earlier upon arrival of the vehicle, the overall time from vehicle arrival to order delivery is reduced, thereby reducing customer wait time and improving the overall customer experience.

Because ALPR technology is imperfect and can sometimes fail to identify a vehicle license plate, redundant vehicle detection systems may be employed within the parking bays of the order pick-up location. In one approach, a proximity sensor may also be provided within or around a parking bay to detect the presence of a vehicle within the parking bay. Thus, in certain examples, if a vehicle enters a parking bay but the ALPR system fails to identify a license plate (and therefore fails to identify any vehicle present within the parking bay), the proximity sensor may detect the presence of the vehicle within the parking bay and may alert the server accordingly. In response, the server can alert a human concierge of the presence of the vehicle within the parking bay. In response, the human concierge can greet the customer and manually check in the vehicle and associated customer for pick-up of a pending pick-up order.

Further, in addition to indicating that a vehicle has arrived, a change in state of the proximity sensor can also indicate that a vehicle has departed a parking bay. For example, even if the ALPR system detects and correctly identifies a vehicle that enters a parking bay, in some configurations, the ALPR system might not detect the departure of the vehicle because a new vehicle with a different license plate has not yet entered the parking bay. Thus, a change in the state of the proximity sensor from present to not-present can provide an indication that the parking bay has become vacant and that the vehicle previously occupying the parking bay has departed.

Further, because the pick-up order fulfillment and/or delivery is ultimately controlled or executed by the human concierge, the human concierge can provide indications through a concierge tool or interface that an order is completed. The server can use this information to determine the state of a customer vehicle (e.g., arriving or departing) or of an individual parking bay. Further, the concierge provides a failsafe to manually check in customers and to determine when customers have departed or arrived.

Handling these multiple inputs presents a technical problem in the implementation of the vehicle detection and customer identification processes. Presented herein are various technical improvements directed to executing a logical process that results in a harmonious synthesis and fusion of the multiple inputs to provide an efficient, accurate, and robust vehicle detection and customer identification solution.

Referring now to the figures, FIG. 1 illustrates an example pick-up location site 100 configured in accordance with various embodiments. The pick-up location site 100 includes a building 101 for storing groceries or goods for pick-up by or delivery to customers. The pick-up location site 100 also includes multiple parking bays 102 (e.g., parking spots, parking spaces, parking pads, parking lanes, parking stalls, drive-through lanes, standing zones, or other suitable parking or idling locations) adjacent to or near the building 101. The parking bays 102 may be accessible by a lane 104, and may be parallel, perpendicular, or angled parking bays in relation to the traffic direction of the lane 104. The lane 104 may include an entrance 106 and an exit 108 to provide access to the lane 104 from one or more adjacent roads (e.g., streets, highways, or other traffic-bearing roads). In different configurations, the entrance 106 and the exit 108 may be the same location, as opposed to the drive-through configuration illustrated in FIG. 1. In still other embodiments, the parking bays 102 may be accessible directly from the road without the use of a lane 104, such as typical parallel, perpendicular, or angled parking spots along the side of a road. One of skill in the art will readily understand that suitable parking configurations can vary depending on the needs or surroundings of the particular pick-up location, which various configurations are contemplated herein.

In various embodiments, cameras 110 are positioned on or around the pick-up location site 100 in various locations. The cameras 110 may be any known camera type, including security cameras, box cameras, dome cameras, pan-tilt-zoom (PTZ) cameras, bullet cameras, day/night cameras, infrared cameras, or other suitable camera types. The cameras 110 are configured such that each camera 110 captures an image of a respective parking bay 102. More specifically, each camera 110 is specifically aimed, zoomed, and focused to capture an image of an approximate location of the rear of a vehicle 112 when the vehicle 112 is parked within the parking bay 102. For example, cameras 110 may be mounted on poles, buildings, or other structures such that the cameras 110 capture images of the rear of the vehicle 112 when parked in the parking bay 102.

In some embodiments, each individual camera 110 is configured to capture images for a single parking bay 102. In other embodiments, some or all cameras 110 may be configured to capture images for multiple parking bays 102. For example, the images produced by the camera 110 may be partitioned or masked to account for the different parking bays 102. Alternatively still, some or all cameras 110 may move or pivot to capture different parking bays 102 at different times. Many variations are possible.

In certain embodiments, other cameras 110 may be provided in other locations to capture images of vehicle license plates as a vehicle enters the pick-up location site 100. For example, a camera 110 may be positioned to capture images of license plates as vehicles drive through the entrance 106. As discussed herein, determining the identity of the vehicle at the entrance 106 may begin the pick-up order fulfillment or delivery process before the vehicle even parks in a parking bay 102 to further reduce customer wait times. In another example, a camera 110 may be positioned to capture images of license plates as vehicles drive through the exit 108 to enable the system to further verify that a vehicle has exited a parking bay 102 and/or the pick-up location site 100.

Additionally, each parking bay 102 may include a proximity sensor 114. The proximity sensor 114 may be positioned within or around the parking bay 102 to detect a vehicle 112 when the vehicle 112 is within the parking bay 102. The proximity sensor 114, also called a parking sensor, may be any known proximity sensor including, without limitation, an ultrasonic detector, an electromagnetic detector, an inductive detector loop, a magnetic detector, an infrared or laser beam detector, a motion sensor, a time-of-flight sensor, or a radar detector. Other types of proximity sensors may be used to detect the presence of a vehicle instead of, or in addition to, a the types of proximity detectors mentioned above, including pressure pads, treadle switches, radio-frequency identification (RFID) sensors, or other sensor or switch types. The proximity sensor 114 may be positioned in any suitable location within or around the parking bay 102 as may be best suited for the particular sensing technology and/or the particular proximity sensor product. For example, the proximity sensor 114 may be affixed to or embedded within the ground surface under or around the vehicle 112 when the vehicle 112 is parked in the parking bay. The proximity sensor 114 may be positioned in front of the parking bay 102 and/or elevated off the ground so that the proximity sensor 114 can detect the vehicle 112 as it pulls into the specific parking bay 102. One of skill in the art will readily understand that many different proximity sensor types and installation locations may be possible and are compatible with the teachings herein.

In some approaches, an additional form of proximity sensor may be implemented using a geofence feature via an application on a customer user device. The geofence feature may provide information to the central server 408 (see FIG. 4) that indicates that the customer user device has passed through an artificial border set with a certain radius (e.g., 500 yards, a half mile, or any other suitable distance) from a particular order pick-up location site, and thus is within a certain proximity of the pick-up location site 100 (albeit a much larger range). The central server 408 may use this inbound geofence information to instruct a concierge at the order pick-up location site to begin preparing a corresponding pending pick-up order for the inbound customer. This earlier indication can serve to further reduce customer wait time upon delivery. Other examples of proximity detection are also possible, including a process wherein a user checks in to a location via a user application on their user device. Still other proximity detectors and proximity detection processes are possible and are contemplated by this disclosure.

In some configurations, the pick-up location site 100 may also include an order progress sign 116 for each parking bay 102. The order progress sign 116 may provide customer feedback specific to the vehicle in each parking bay 102. For example, the order progress sign 116 may provide an indication that the customer identification system detects the vehicle in the parking bay 102, that the vehicle is checked in, that the pick-up order is being processed, that the pick-up order is being delivered, and that the pick-up order is completed. Other information may be provided as well, including, for example, a timer, an indication that a concierge is on his or her way, or other suitable information. The order progress sign 116 may be positioned in view of the driver of the vehicle 112.

Figure 2:
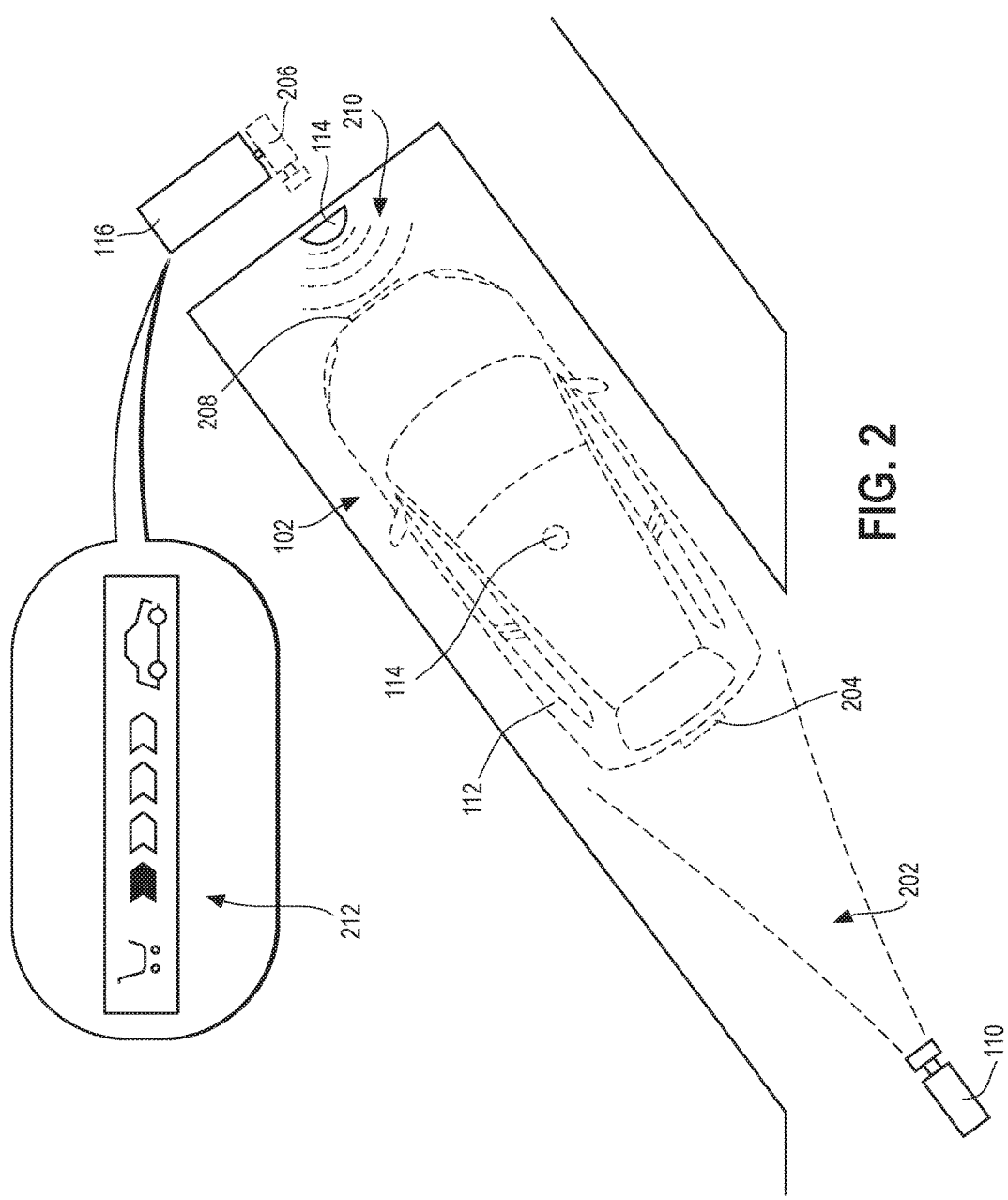
FIG. 2 is a diagram of an example parking bay within the pick-up location site of FIG. 1 configured in accordance with various embodiments.

FIG. 2 illustrates a more detailed view of the parking bay 102 with a vehicle 112 parked therein. As discussed above, a camera 110 is aimed such that the rear of the vehicle 112 is within the field of view 202 of the camera 110. More specifically, the camera 110 is configured (aimed, zoomed, or focused) to focus on a rear license plate 204 of a vehicle 112 when the vehicle 112 is parked in the parking bay 102 within the field of view 202. In certain embodiments, a second camera 206 may be positioned to capture images of the vehicle 112 within the parking bay 102 from an additional or different angle or viewpoint. In one approach, the second camera 206 may be positioned at the front of the parking bay 102 to capture an image of a front license plate 208 of the vehicle 112. Having two images of the different license plates 204 and 208 of the vehicle 112 may serve to increase accuracy of vehicle detection using ALPR.

The parking bay 102 also includes one or more proximity sensors 114 that can detect the presence of the vehicle 112 within the parking bay 102, for example, using electromagnetic, ultrasonic, or optical waves 210. Alternatively, the proximity sensor 114 could be placed on the ground surface near the center (or elsewhere) of where a vehicle 112 parks within the parking bay 102. Many variations are possible.

The parking bay 102 also includes the order progress sign 116. An example of the information 212 provided to the driver of the vehicle 112 on the order progress sign 116 is shown in the inset view in accordance with one embodiment. The information 212 provided and/or a format of the order progress sign 116 is highly variable and can include other content, such as other information related to a pick-up order, specific items in the pick-up order, or the order pick-up service provider, as well as advertisements or other entertaining or informative content. The order progress sign 116 may include a preconfigured display including lights or other indicators. Alternatively or additionally, the order progress sign 116 may include a display panel configured to display graphics in accordance with above.

Figure 3:
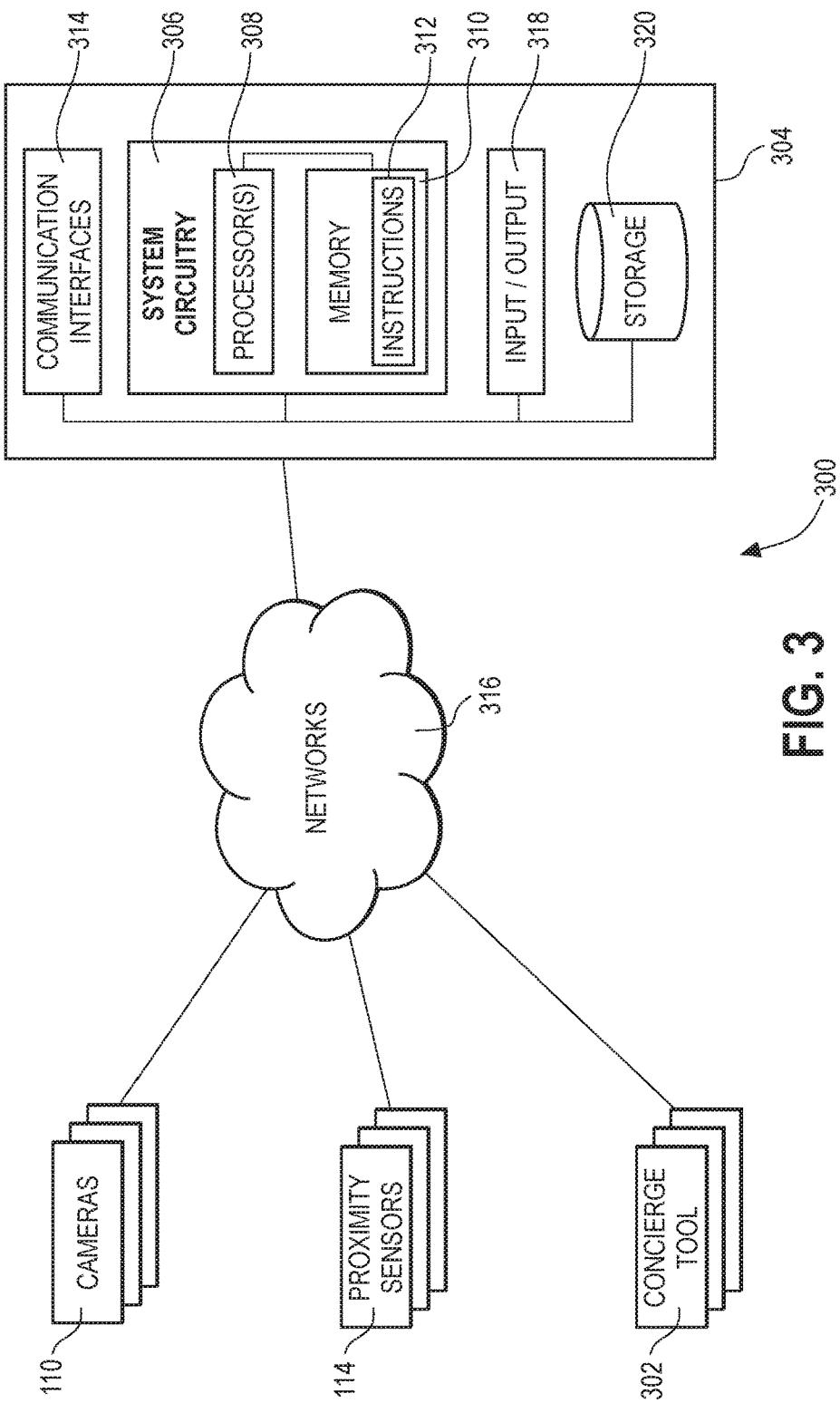
FIG. 3 is a block diagram of an example implementation of a system for detecting and identifying customers within parking bays in accordance with various embodiments.

FIG. 3 illustrates a block diagram of an example implementation of a system 300 for detecting and identifying customers within parking bays 102 in accordance with various embodiments. The system 300 includes the cameras 110 and the proximity sensors 114. The system 300 also includes a concierge tool 302. The concierge tool 302 may include an electronic user device, such as a portable computer, a tablet computing device, a smartphone, a digital media device, an eBook reader, a laptop or netbook computing devices, wearable computing devices, augmented reality devices, helmets, goggles or glasses, or any other suitable electronic user device. The electronic user device may also include software or applications (e.g., an ANDRIOD or IOS application) to enable interaction with the system 300. The concierge tool 302 is operated by human concierge users to interface with the system 300 to receive and provide instructions or information. Multiple concierge tools 302 may be included as part of the system 300, which may include one or more concierge tools 302 used by multiple human concierge users at a pick-up location site 100.

In various embodiments, the system 300 includes one or more servers 304 with which the cameras 110, the proximity sensors 114, and the concierge tool 302 communicate. In various embodiments, the servers 304 may include a single server or may include multiple co-located or remote servers. In certain examples, the servers 304 may be implemented in whole or in part within a cloud-computing environment or cluster, for example, within an AMAZON WEB SERVICES™ (AWS) cloud-computing environment and/or, more specifically, using AMAZON ELASTIC COMPUTE CLOUD™ (EC2) instances within an AMAZON VIRTUAL PRIVATE CLOUD™ (VPC). Various processes and modules may be partitioned and executed by different servers within the cloud-computing environment.

These servers 304 may include system circuitry 306, which may further include one or more processors 308, memory 310, and/or other circuitry. The processors 308 may include one or more processors within a single server or distributed across multiple servers or systems, for example, in a cloud-computing environment or a multiple server configuration. The memory 310 may comprise a memory system including a plurality of memory devices or other computer-readable media collocated or distributed across multiple servers or systems. The memory 310 may store control instructions 312 and/or operational parameters, datasets, and other information. The instructions 312 may correspond to the various elements illustrated in FIG. 4, as well as the various method steps illustrated in FIGS. 5-11. As such, in certain embodiments, the memory 310 may be considered computer readable media with instructions stored thereon for execution by the processors 308 to cause the processors 308 to perform a multitude of steps described herein. The processors 308 may be connected to the memory 310 and may execute the control instructions 312 to implement any of the functions described herein. For example, the system circuitry 306, including the processors 308 and the memory 310, may implement, in whole or in part, some or all of the modules, elements, functions, processes, methods, and/or features described herein. So arranged, the system circuitry 306, the processors 308, and/or the servers 304 are each configured to perform the processes and functions disclosed herein.

The servers 304 may also include communication interfaces 314 to enable the servers 304 to communicate with each other and with the cameras 110, the proximity sensors 114, and the concierge tool 302 across the networks 316. The servers 304 may also include one or more input/output devices 318, for example, to enable local maintenance engineers to interact with the servers 304. The servers 304 may include a storage device 320, which may comprise one or more hard drive discs, memory devices, or multiple other storage devices configured to store databases, customer data, order data, and other mass data. The storage device 320 may be internally maintained within the servers 304 or remotely maintained and accessible by the servers 304 via the networks 316. The storage device 320 may include copies of the instructions 312 or other data or instructions used by the servers 304 to implement the functions and features described herein.

The networks 316 may include any network connecting the various devices together to enable communication between the various devices. For example, the networks 316 may include the Internet, an intranet, a local area network (LAN), a virtual LAN (VLAN), or any combination thereof. The networks 316 may be wired or wireless and may implement any protocol known in the art. Specific network hardware elements required to implement the networks 316 (such as wired or wireless routers, network switches, broadcast towers, and the like) are not specifically illustrated; however, one of skill in the art recognizes that such network hardware elements and their implementation are well known and contemplated. For example, in a cloud-computing environment, the cameras 110, the proximity sensors 114, and/or the concierge tool 302 may communicate on a LAN (e.g., a VLAN) with a local router physically located at the pick-up location site. The local router may in turn enable communication with the physically remote cloud-computing environment (e.g., servers 304), for example, via the Internet. Other variations are possible.

Figure 4:
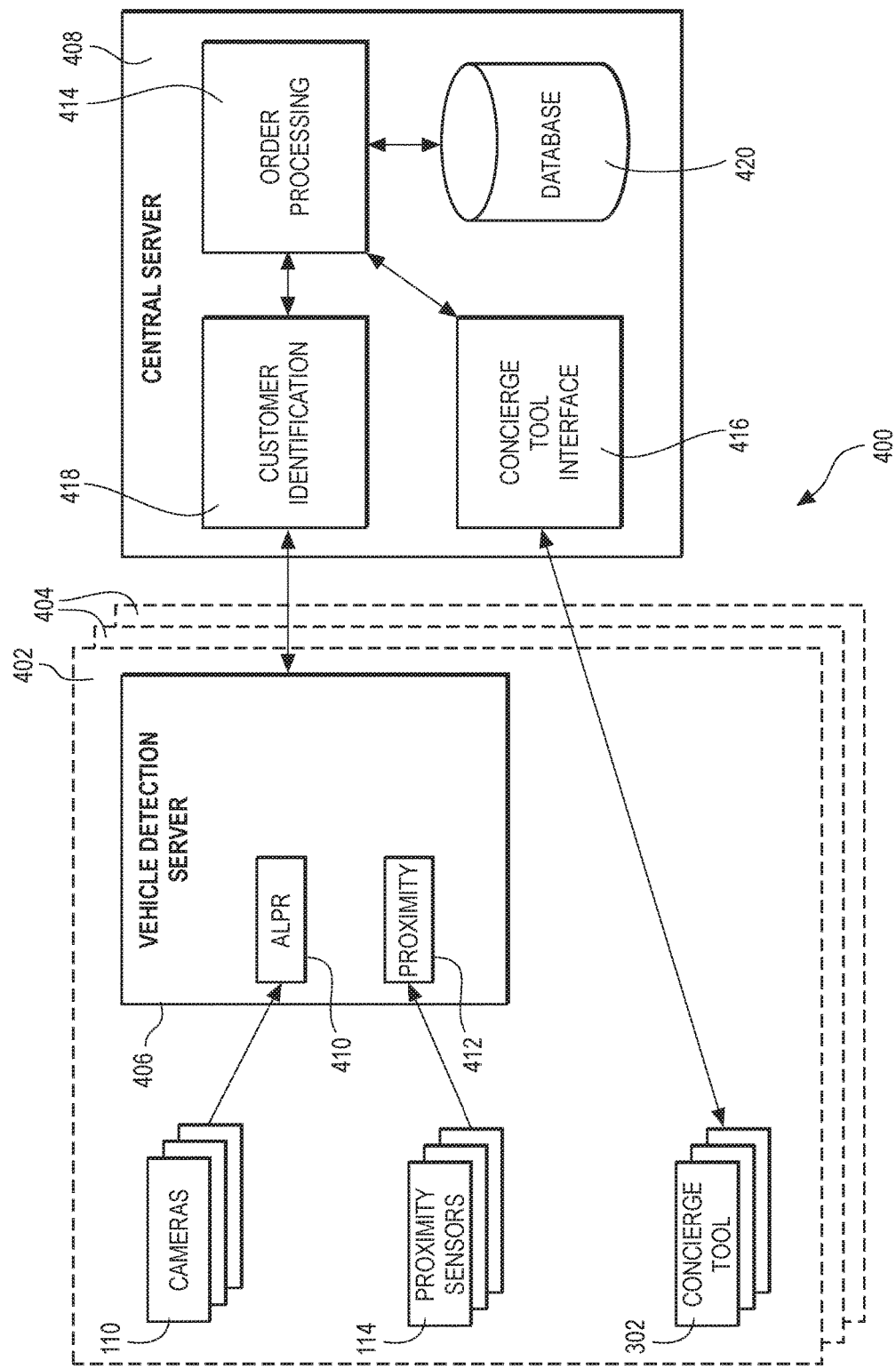
FIG. 4 is a block diagram of an example architecture for a system for detecting and identifying customers within parking bays in accordance with various embodiments.

FIG. 4 illustrates a block diagram of an example system architecture for the system 400 for detecting and identifying customers within parking bays 102 in accordance with various embodiments. In certain embodiments, system 400 is the same as system 300, however, the block diagram of FIG. 4 highlights the logical or functional architecture of the system 400 whereas FIG. 3 highlighted many of the hardware aspects. The logical or functional architectural elements illustrated in FIG. 4 may be implemented by or on the system 300 of FIG. 3, specifically by the servers 304, the system circuitry 306, and/or the processors 308.

FIG. 4 illustrates the cameras 110, the proximity sensors 114, and the concierge tool 302 as associated with a pick-up location site 402. There may be other pick-up location sites 404 associated with other physical pick-up location sites that have a similar system architecture as is shown for pick-up location site 402 (possibly with a different number of cameras 110, proximity sensors 114, and/or concierge tools 302).

The pick-up location site 402 may include or be associated with a vehicle detection server 406. The vehicle detection server 406 may be a local physical server (such as servers 304) located at or near the physical pick-up location site 100. Alternatively, the vehicle detection server 406 may be instantiated on a remote cloud-computing environment, such as within AMAZON EC2. In such a configuration, the vehicle detection server 406 may not be physically located at the pick-up location site 100, but may be logically associated with or dedicated to the physical pick-up location site 402. A different vehicle detection server 406 may be instantiated on the cloud-computing environment for each of the other physical pick-up location sites 404, as well, to handle the operation and information from cameras and proximity detectors at those other sites.

The different vehicle detection servers from each pick-up location site 402 or 404, including vehicle detection server 406, each communicate with a central server 408. In this manner, the central server 408 can communicate with all of the different pick-up location sites 402 and 404 to control high-level operations and to provide and receive information that is centrally maintained and used for operations of each of the pick-up location sites 402 and 404. In some embodiments, the system 400, and in particular, the central server 408, may communicate with customer user devices over the networks 316 when the customer user devices are operating an application associated with the pick-up service.

The vehicle detection server 406 may include an automatic license plate reading (ALPR) module 410, including ALPR circuitry (such as processors 308 and instructions 312) that executes an ALPR process to read license plates in images received from the cameras 110. In one embodiment, the ALPR module 410 implements the open source software OpenALPR to perform the ALPR process. In particular, the ALPR module 410 receives images from an individual camera 110, detects a license plate in the image, and performs an optical character recognition process to determine the characters in the license plate. The ALPR module 410 may receive multiple images over time (such as frames of a video) and may perform the ALPR process for each image to acquire a more accurate determination of the characters in the license plate. In one embodiment, the ALPR module 410 performs the ALPR process on sets of ten images received at a rate of 15 fps, though other configurations are possible. After performing the ALPR process, the APLR module 410 outputs one or more candidate license plate identifications. The ALPR module 410 also outputs an associated confidence level indicating a confidence that the candidate license plate identification is the actual license plate number. The vehicle detection server 406 (or the ALPR module 410, specifically) filters out candidate license plate identifications with corresponding confidence levels that do not meet or exceed a confidence threshold (e.g., 80% confidence). Those candidate license plate identifications with high enough corresponding confidence levels are subsequently communicated to the central server 408, and specifically to the customer identification module 418, discussed below. The ALPR module 410 can account for a license plate that remains within the image and, in accordance with various approaches, will only output a new candidate license plate identification when the ALPR module 410 detects a new license plate in the image. The output of the ALPR module 410 is a streamed output, meaning that as the ALPR module 410 detects a new license plate, it will output the determined candidate license plate identifications, which the vehicle detection server 406 can subsequently pass on to the customer identification module 418.

In alternative embodiments, the ALPR module 410 may be implemented on the cameras 110 themselves (e.g., executed on processors within the cameras 110) and the results of the ALPR process (e.g., candidate license plate identifications) are transmitted to the vehicle detection server 406. In such an arrangement, network traffic between the cameras 110 and the vehicle detection server 406 can be greatly reduced by sending data corresponding to recognized license plates instead of video feeds, which include much data intensive.

The vehicle detection server 406 also includes a proximity interface module 412 including proximity interface circuitry (such as processors 308 and instructions 312) that executes a proximity interface process to poll proximity sensors 114 and interpret the received proximity data accordingly. Unlike the ALPR process, which is a streamed data output, the proximity sensors 114 must be polled. One technical challenge in implementing the system 400 is harmonizing the streamed data output form the ALPR system with the polled data from the proximity sensors 114. The proximity interface module 412 addresses this technical challenge with the proximity interface process performs the polling of the proximity sensors 114, interpreting the data, and outputting set state changes (i.e., present or non-present) according to timing thresholds in a similar manner to outputting a data stream.

As part of the proximity interface process, the proximity interface module 412 polls each of the proximity sensors 114 to determine whether the individual proximity sensor 114 presently detects that a vehicle is present or not present. In one approach, the proximity interface module 412 polls each individual proximity sensor every 0.5 seconds (though other polling timing may be implemented in other embodiments). The output of the individual proximity sensors 114 can change quickly and/or briefly in response to events or conditions other than those representative of a vehicle being parked in the parking bay. For example, because many proximity sensors cannot specifically determine that a parked vehicle is the proximity triggering entity (as opposed to a person or other obstruction), the proximity sensors 114 may detect proximity if a person walks in front of the sensor, a leaf blows across the sensor, a car drives by too closely, or some other misleading event, glitch, or condition occurs. To account for these false proximity detection events, the proximity interface module 412 incorporates a hysteresis aspect to filter out short false proximity detection events.

When polling a proximity sensor 114, if the proximity interface module 412 receives an polling response sample that is different from the previous polling response sample, the proximity interface module 412 will not change its proximity output state for that proximity sensor until it receives a string of consistent samples of the same reading (e.g., present or non-present) of at least n-samples long, where n is a sample number threshold. In one embodiment, n=5 consistent samples (representing consistent present detection or non-present detection for two seconds after the initial changed sample, assuming a 0.5 second polling period). The proximity interface module 412 may implement different sample number thresholds for transitions from the "present" set state (occupied) to the "non-present" set state (vacant), and vice versa. Accordingly, the proximity interface module 412 only changes its output proximity set state ("present" or "non-present") once the polled data for the particular proximity sensor steadily indicates that a vehicle is present or is not present. This will filter out most false proximity events as once a vehicle parks in the parking bay 102 the vehicle typically remains in the parking bay 102 until the order is complete, which is longer than the two seconds discussed above. Similarly, once the vehicle departs the parking bay, the parking bay 102 typically remains vacant until the next vehicle arrives (typically longer than the two seconds discussed above). The proximity interface process is illustrated as a portion of FIG. 7, discussed below.

The central server 408 communicates with the vehicle detection server 406 and the concierge tool 302. In one approach, the central server 408 receives and sends messages to and from the vehicle detection server 406 using AMAZON Simple Notification Service (SNS) messages and Simple Queue Service (SQS) messages, though other messaging and communication schemes or protocols are possible. The central server 408 may perform the necessary processes to identify vehicles or customers, associate pick-up orders with customers, process orders received from customers (e.g., online orders), coordinate pick-up order fulfillment and delivery workflows, and communicate with human concierge users or other individuals at the pick-up location site 100. The central server 408 may include an order processing module 414, a concierge tool interface 416, a customer identification module 418, and a database 420. The order processing module 414 handles customers' pick-up orders and coordinates efforts to fulfill the pick-up orders. The database 420 includes data corresponding to the customers (including license plate identifications or license plate hash values), pending and past pick-up orders, and the multiple pick-up location sites 402 and 404.

The concierge tool interface 416 may implement a gateway service between the order processing module 414 and the concierge tool 302 to allow the order processing module 414 to communicate with the concierge tool 302. In one approach, the concierge tool interface 416 may provide a representational state transfer (REST) interface. The concierge tool 302 may communicate with the concierge tool interface 416 via the networks 316 to send and receive data representative of a pick-order fulfillment workflow. For example, a human concierge user will utilize the concierge tool 302 to manually check in vehicles and customers into a parking bay 102 for pick-up of a pending pick-up order (for example, if the customer identification module 418 fails to identify the vehicle and corresponding customer). In one approach, the human concierge user, using the concierge tool 302, can manually enter the license plate number of the license plate on the vehicle, can associate a customer with the license plate number, and can check-in the customer for pick-up of their associated pending pick-up order. The concierge tool 302 can provide instructions or information to the human concierge user to help fulfill and deliver the pick-up order. Once the pick-up order is completed (e.g., delivered), the human concierge user can provide a manual input to the concierge tool 302 to indicate that the pick-up order has been completed. The concierge tool 302 can communicate the manual indication that the pick-up order is completed to the order processing module 414 via the networks 316 and the concierge tool interface 416.

The customer identification module 418 may include customer identification circuitry (such as processors 308 and instructions 312) that executes a customer identification process. In one embodiment, the customer identification module 418 receives one or more candidate license plate identifications (or candidate license plate identification hash values) from the vehicle detection server 406. The customer identification module 418 then checks the received candidate license plate identifications against know license plate identifications already associated with customers and stored in the database 420. The customer identification module 418 also checks whether the identified customer corresponding to the candidate license plate has any pending pick-up orders and automatically checks in the customer and the vehicle for pick-up of the pending pick-up order. If there is no corresponding known license plate identification or no corresponding pending pick-up order, the concierge tool interface 416 can send a message to the concierge tool 302 prompting the human concierge user to manually check in the vehicle and customer parked at the specific parking bay 102.

Figure 5:
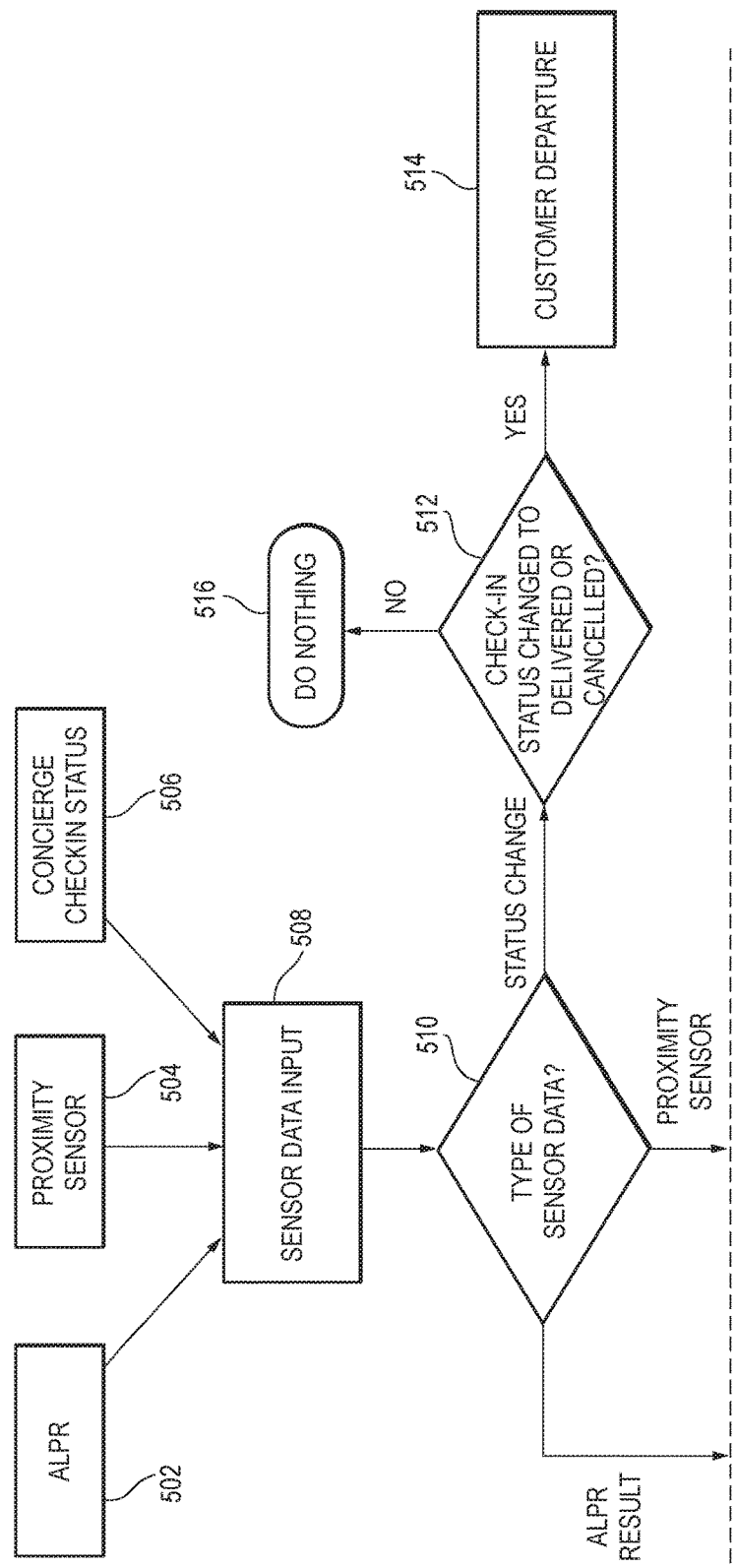
FIG. 5 is an example flow diagram of logic to provide the functionality of vehicle detection and customer identification processes in accordance with various embodiments.
Figure 6:
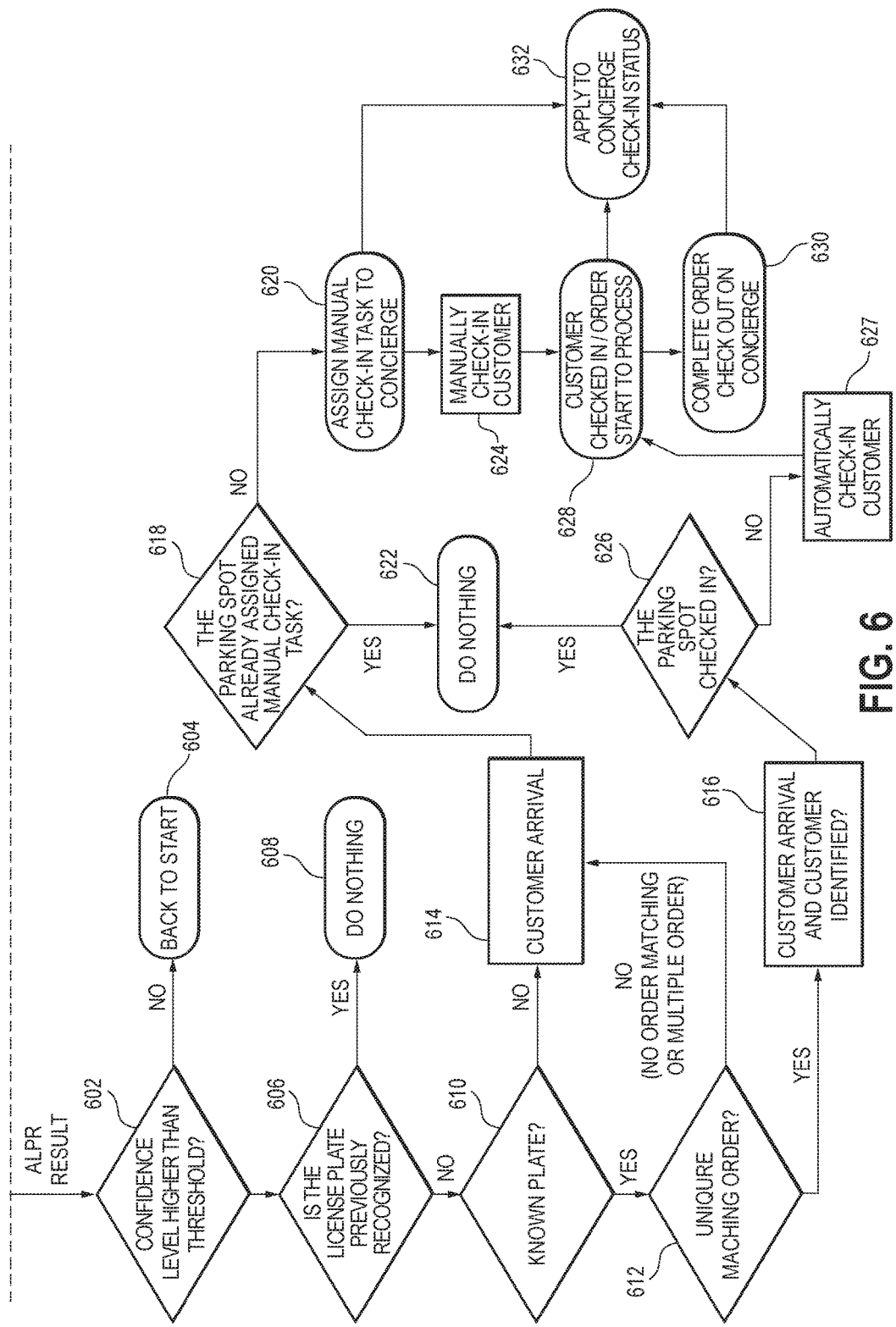
FIG. 6 is another example flow diagram of logic illustrating additional functionality of the vehicle detection and customer identification processes illustrated in FIG. 5 in accordance with various embodiments.
Figure 7:
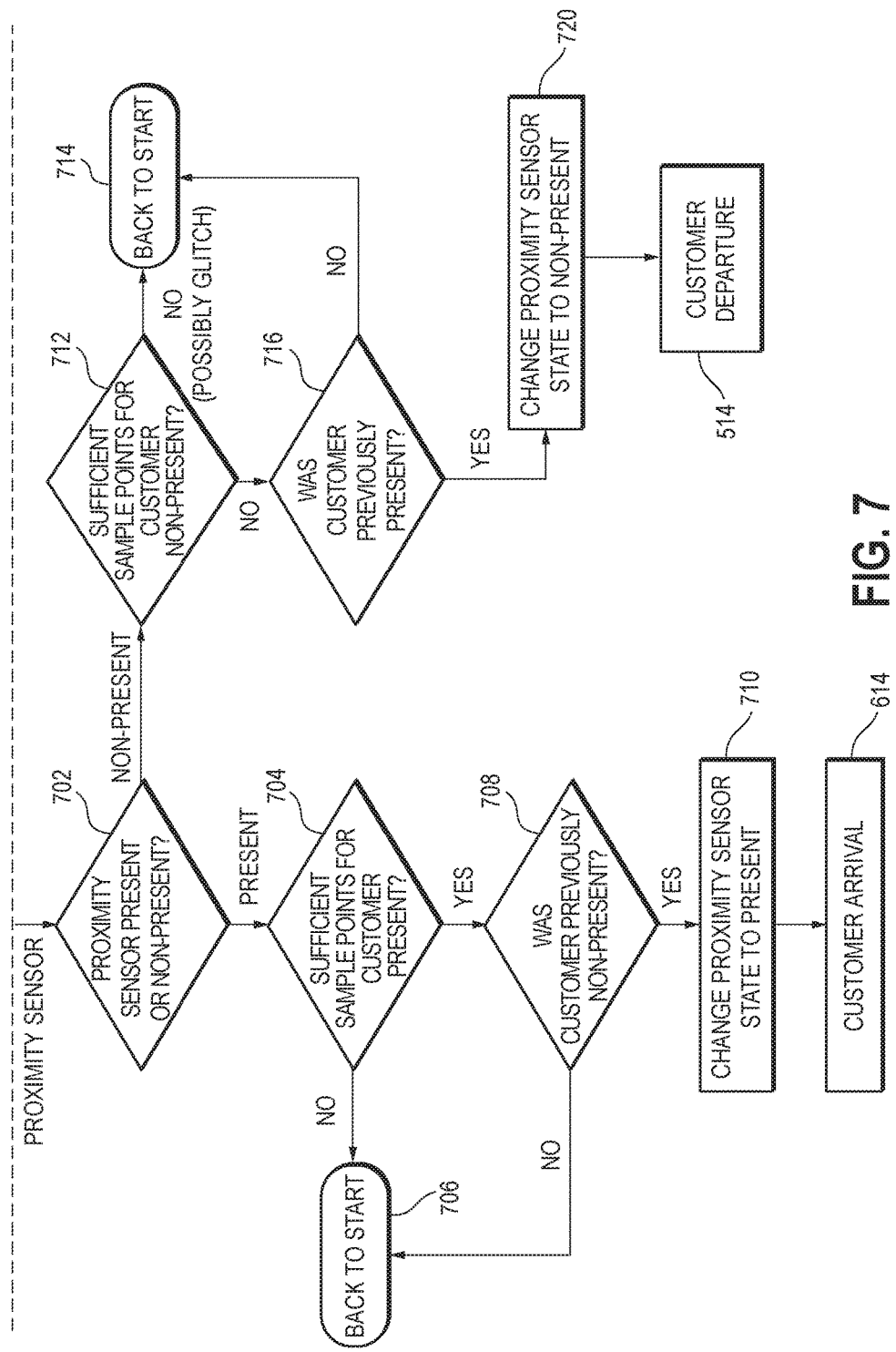
FIG. 7 is another example flow diagram of logic illustrating additional functionality of the vehicle detection and customer identification processes illustrated in FIGS. 5 and 6 in accordance with various embodiments.

FIGS. 5-7 illustrate a flow diagram of logic implemented by the servers 304 to provide the functionality of the vehicle detection and customer identification processes discussed above. In certain embodiments, the system 400 receives inputs from three different sources: ALPR results 502 from the cameras 110 and ALPR module 410; proximity sensor data 504 from the proximity sensors 114; and concierge check in status data 506 from the concierge tool 302. Accordingly, each of the three figures (FIGS. 5, 6, and 7) illustrates how the system 400 handles each of the three different input sources. There are also three primary vehicle events or states that the vehicle detection and customer identification processes are designed to automatically determine: a customer departure, a customer arrival, and a customer arrival with automatic customer identification. Additionally, as a failsafe, the human concierge user can provide manual inputs into the system via the concierge tool 302 to address or override any errors or incorrect vehicle event determinations.

FIG. 5 illustrates the three different input sources (ALPR results 502, proximity sensor data 504, and concierge check in status data 506) provided as data inputs 508 into the system 400. At 510, the system 400 determines the type of data it receives, which dictates the other processing steps that the system 400 will perform with the received data. The remainder of FIG. 5 illustrates the logical flow for processing concierge check in status data 506. If the system 400 receives a status change initiated by the human concierge user via the concierge tool, the system 400 at 512 determines whether the received status change corresponds to an indication that the customer is checked out (e.g., a pick-up order has been completed or delivered, a customer's check in has been cancelled, or the customer has been otherwise checked out). If the received status change corresponds to a check out, then the system will categorize the event as a customer departure 514. The system 400 will set a state for the particular parking bay 102 in which the departing customer was previously parked as currently checked out, as well. As will be discussed below, this will enable the system 400 to properly process subsequent ALPR results for the same vehicle as that vehicle is departing (e.g., to avoid repeatedly automatically or manually checking in the same customer). Returning to step 512, in various embodiments, if the received concierge check in status data corresponded to a different type of event (e.g., an event other than a check out), then the system 400 may note the status change but otherwise do nothing 516 with the status change.

FIG. 6 illustrates a logical flow for processing ALPR results 502. If the system 400 receives an ALPR result (e.g., a candidate license plate and an associated confidence level), the system 400 at 602 determines whether the candidate license plate identification received with the ALPR result has an associated confidence level that is higher than a confidence level threshold (e.g., 80%, though other values can be used). If the confidence level is below the confidence level threshold, then the system 400 does nothing with the ALPR result and returns to the start of the process at 604. If the confidence level is above the confidence level threshold, then the system 400 determines whether the candidate license plate is a previously recognized license plate at step 606. A previously recognized license plate is one that has been recently recognized by the system 400. For example, the previously recognized license plate may be a license plate that was just previously recognized at a particular parking bay 102 in which it is being recognized again. This may indicate that the ALPR module 410 is re-recognizing the same license plate for a vehicle as it is departing, as it is re-adjusting its parking alignment, or as it has been sitting in the parking spot. As such, system 400 will do nothing with the ALPR result at 608. Similarly, the system 400 may have already checked out the customer, thereby identifying the customer as a departing customer, in which case the system 400 will again do nothing with the ALPR result at 608. In some embodiments, at step 606, the system 400 may determine whether it has previously recognized the license plate within a previous amount of time such as, for example, within the previous five minutes, 30 minutes, two hours, or another suitable time. In this embodiment, if the previous recognition occurred before this set amount of time, then the system may begin a check-in process again. Alternatively, the system may not include a time aspect and, as long as the same license plate is recognized, the system will continuously categorize the vehicle as a departing vehicle until such time as a new license plate is recognized.

If during step 606 the system 400 determines that the license plate is not a previously recognized license plate, the system 400 will then determine if the candidate license plate identification matches any known license plate identifications stored in database 420 at step 610. In one approach, to make this determination, the customer identification module 418 of the central server 408 searches the database 420 for a matching known license plate identification associated with a customer. If a matching known license plate identification is discovered, the system 400 can make a determination that it has properly identified the vehicle and the associated customer and can continue to step 612. If no matching known license plate identification is discovered, the system 400 cannot automatically identify the customer. However, the system 400 has successfully identified that a customer has arrived in the parking bay 102. As such, the system 400 can recognize the vehicle event as a customer arrival 614 and can perform subsequent processes (step 624) to manually check in the arriving customer.

If during step 610 the system 400 found a matching known license plate identification, the system 400 can determine at step 612 whether the customer and/or customer user account associated with the known license plate has a pending pick-up order. If yes, then the system 400 can recognize the vehicle event as a customer arrival with customer identification 616 and can perform subsequent processes to fulfill, deliver, and complete the pending pick-up order in steps 628 and 630. However, if during step 612 the system 400 determines that the identified customer does not have pending pick-up order, or has more than one pending pick-up order (possibly indicating the vehicle is a shared vehicle or that the customer could be picking up one or multiple orders), the system 400 will recognize the vehicle event as a customer arrival (without customer identification) 614. Although the vehicle and customer may technically be identified by the system 400, the system 400 does not know which particular pick-up order the customer is picking up. As such, the system 400 prompts the human concierge to manually check in the customer to determine the proper pick-up order at step 620.

Once a customer arrival event 614 has been determined, (e.g., without customer identification or pick-up order identification), the system 400 determines at step 618 whether the specific parking bay in which the vehicle is parked has been assigned a manual check in task. The system 400 may review the current concierge check in status to determine if the check in task has already been assigned to one or more concierges. If not, then the system 400 at step 620 will assign the task to one or more human concierge users, via the concierge tool 302, to greet the newly arrived customer and manually check in the customer. If, however, during step 618, the system 400 determines that the manual check in task has already been assigned for that parking bay 102 in a previous iteration of step 620, which manual check in during step 624 has not yet been completed, then the system 400 will do nothing 622 and instead wait for the manual check in process to be completed by the concierge at step 624.

If the system 400 successfully identified the customer and a corresponding pending pick-up order and categorized the vehicle event as a customer arrival with customer identification 616, the system 400 will determine if the parking bay 102, or the vehicle parked therein, has already been checked in during step 626. If the parking bay 102 has already been checked in, then the system 400 will do nothing in step 622. However, if the parking bay 102 has not been checked in already, then the system 400 will automatically check in the customer at the parking bay 102 in step 627.

Once the concierge successfully manually checks in the customer in step 624, or the system 400 automatically checks in the customer in step 627, the concierge status for that parking bay 102 changes to indicate the check in process is completed and the corresponding pending pick-up order begins to be processed and delivered in step 624. Once the pick-up order has been delivered, the concierge manually enters an input to the concierge tool 302 in step 630 to indicate that the pick-up order has been completed. This may include pressing a button or a touchscreen prompt or providing some other command or input (e.g., a gesture or a voice command) on the concierge tool 302 to indicate that the order is completed. Each of the concierge check in statuses discussed with respect to steps 620, 628, and 630 are applied to the concierge check in status data 506 that serves as an input to the system 400 at step 632. As noted above, an important concierge status is the indication that the order is complete, which, as discussed with respect to FIG. 5, allows the system to successfully identify a vehicle as belonging to a departing customer and frees up the parking bay 102 for subsequent check ins by other newly arriving customers.

As new customers arrive at pick-up location sites and are checked in for the first time by the concierge in step 624 or successfully complete a pick-up order in step 630, any license plate identification recognized by the ALPR module 410 (or converted hash values of their license plate numbers) are stored within database 420 and associated with the customer and the customer user account. This may include a single recognized license plate identification or a set of multiple license plate identifications recognized during the ALPR process. Additionally, for previously-recognized customers, any new license plate identifications generated through the ALPR process can be added to the list of license plate identifications (or hash values thereof) stored within the database 420 already associated with a customer upon check-in and/or successful checkout of the customer. These stored license plates are then considered known license plates and can be searched by the system 400 at step 610 during subsequent visits by the customer to enable the system 400 to properly identify the vehicle and the corresponding customer. In certain approaches, users can opt out of the automatic customer identification process to avoid having their license plate number (or even the converted hash value of their license plate number) stored or associated with their account.

In some embodiments, in order to maintain the privacy of customer data, the system 400 will perform a one-way hash operation on the received candidate license plates to generate a license plate hash value. The license plate hash value cannot be reversed to determine the actual license plate number associated with the customer and/or saved within the database 420. The system 400 applies the same one-way hash algorithm to all license plate identifications. As such, the system 400 can perform the process steps using the license plate hash values including making comparisons, searching for known license plates and their associated customers, and storing license plates as associated with customers. The exceptions to exclusively using the license plate hash values occur during the ALPR process, wherein the ALPR module 410 recognizes the license plate, and during manual entry of a license plate identification by a human concierge user. However, once the license plate identification is converted to a license plate hash value, the system 400 may discard the actual license plate identification for security purposes.

In certain embodiments, the ALPR module 410 may provide a set of multiple candidate license plate identifications, as well as associated confidence levels, as an ALPR result. Typically, these sets of candidate license plate identifications range from 2-5 identifications). Certain alphanumeric characters may reduce the confidence level for a given candidate license plate identification and/or may result in multiple candidate license plate identifications. For example, the letters "I" or "B" may commonly be mistaken for the numbers "1" or "8," respectively. Thus, if a license plate reads "IXB 123", the ALPR module 410 may correctly determine the license plate number as one of its candidate license plate identifications "IXB 123" while also providing other similar candidate license plate identifications of "1XB 123," 1X8 123," IX8 I23," and so forth.

Although these multiple possible results may be provided, system testing and development has shown that, typically, the candidate license plate identification with the highest associated confidence level is usually the correct license plate identification. However, to be sure, the various comparisons and searches discussed above can be performed for all candidate license plates within the result set that exceed the confidence level threshold to improve the chances of correctly identifying the arriving customer. For example, at step 606, the entire set of candidate license plate identifications may be compared to the entire set of previous candidate license plate identifications from a previous ALPR result. If even one new candidate license plate identification matches one old candidate license plate identification, the system 400 may assume that it is identifying the same vehicle it previously identified. Similarly, at step 610, the system can search the database 420 for known license plate identifications using all of the multiple candidate license plate identifications in the result set to improve the chances for positive vehicle identification.

In certain embodiments, steps 602 and 604 may be performed by the vehicle detection server 406, while steps 606, 608, 610, 612, 614, 616, 618, 622, 626, 627, and 632 may be performed by the customer identification module 418 at the central server 408 and steps 620, 624, 628, and 630 may be performed by the concierge tool interface 416 and/or the concierge tool 302. However, in other embodiments, these steps may be performed by other modules or on other servers.

FIG. 7 illustrates a logical flow for processing proximity sensor data 504. When the system 400 receives proximity sensor data 504 (e.g., present or non-present) in response to polling the proximity sensors 114, the system 400 (and in particular, the proximity interface module 412) at 702 determines whether the proximity sensor data was a present response (indicating the proximity sensor 114 detected vehicle presence) or a non-present response (indicating the proximity sensor 114 did not detect vehicle presence). If it was a present response, then the system 400 next determines at step 704 whether there are a sufficient number of successive present sample points (e.g., greater than or equal to the sample number threshold n) to indicate that a vehicle is present at the parking spot. If not, then the system 400 may do nothing with the sample data in step 706 as it may simply be a glitch (e.g., a temporary and false change in sensor state) or the number of consecutive present samples is not high enough to trigger the state change.

If the number of successive present sample points is sufficient, then the system 400 will determine if the previous set state of the proximity sensor 114 was set to "non-present" in step 708. If no (meaning the previous state of the parking bay 102 was already occupied), then the system 400 will not change the set state of the proximity sensor 114 (because it is already set to "present") and will return to step 706 to do nothing. However, if the previous set state of the proximity sensor 114 was "non-present," then the system 400 will change the set state for the proximity sensor to "present" in step 710. The system 400 may recognize the change in the set state of the proximity sensor as a customer arrival 614 as discussed with respect to FIG. 6. The system 400 can then continue with step 618 and the other subsequent steps in FIG. 6 to manually check in the newly arrived customer. In one approach, the situation where the system 400 detects a vehicle via the proximity sensors 114 serves as a backup detection system to detect the vehicle in instances where the ALPR module 410 fails to recognize a license plate for any number of reasons (e.g., poor lighting, a glare, a missing license plate, or a dirty or damaged license plate).

Returning to step 702, if the system 400 determines that the proximity sensor data was a non-present response (indicating the proximity sensor 114 did not detect vehicle presence), then the system 400 next determines at step 712 whether there are a sufficient number of successive non-present sample points (e.g., greater than or equal to the sample number threshold n) to indicate that a vehicle is not present at the parking spot. If not, then the system 400 may do nothing with the sample data at step 714 as it may simply be a glitch (e.g., a temporary and false change in sensor state) or the number of consecutive non-present samples is not high enough to trigger the state change.

If the number of successive non-present sample points is sufficient, then the system 400 will determine if the previous set state of the proximity sensor 114 was set to "present" in step 716. If no (meaning the previous state of the parking bay 102 was already vacant), then the system 400 will not change the set state of the proximity sensor 114 (because it is already set to "non-present") and will return to step 714 to do nothing. However, if the previous set state of the proximity sensor 114 was "present," then the system 400 will change the set state for the proximity sensor to "non-present" in step 720. The system 400 may recognize the change in the set state of the proximity sensor as a customer departure 514 as discussed with respect to FIG. 6. The system 400 may then mark the particular parking bay 102 as not checked in (if not already done so by the concierge as part of step 630 in FIG. 6).

Although the steps in FIGS. 5-7 are illustrated in a particular order, the order of the steps may be altered in other embodiments while providing a same or similar result.

FIGS. 8-11 show example flow diagrams of logic that the servers 304, the processors 308, or various ones of the modules or circuitry elements illustrated in FIGS. 3 and 4 may implement to provide features of the vehicle detection and customer identification processes discussed herein. Many of the steps shown in in FIGS. 8-11 may correspond or relate to steps illustrated in FIGS. 5-7, but are shown in different orders and responsive to varying input events to highlight particular situations that the system 400 is designed to accommodate and account for.

Figure 8:
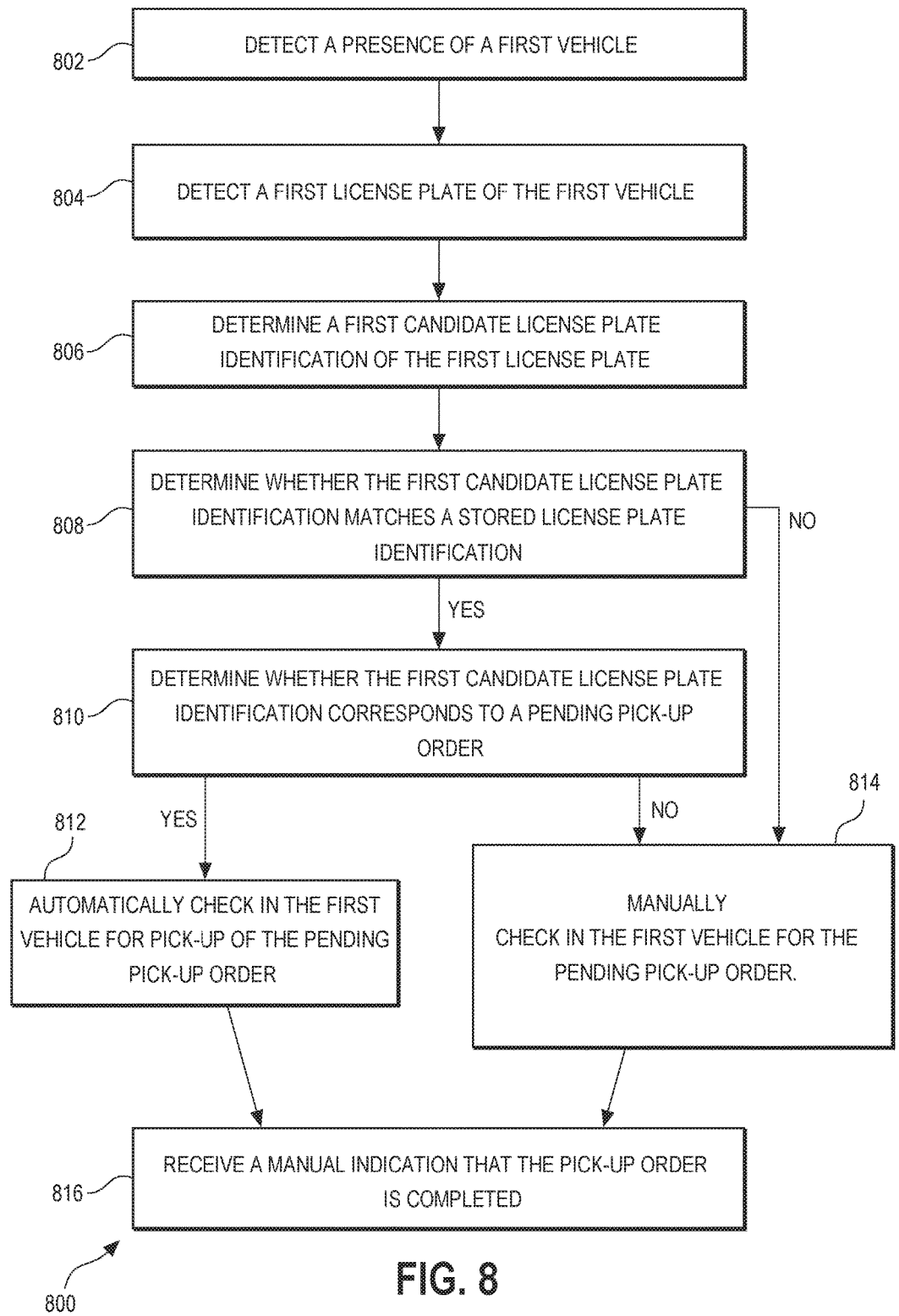
FIG. 8 is an example flow diagram of logic to check in a newly arriving customer and subsequently complete a pick-up order in accordance with various embodiments.

FIG. 8 shows an example flow diagram of logic 800 to check in a newly arriving customer and subsequently complete a pick-up order. At step 802, a proximity sensor 144 detects a presence of a first vehicle 112 within the parking bay 102. At step 804, the ALPR module 410 (or ALPR circuitry) detects a first license plate of the first vehicle within the parking bay 102 using a camera 110. The ALPR module 410 determines a first candidate license plate identification of the first license plate at step 806. Subsequently, at step 808, the customer identification module 418 (or customer identification circuitry) determines whether the first candidate license plate identification matches a stored license plate identification (corresponding to a customer account) and, at step 810, determines whether the first candidate license plate identification or the identified associated customer account corresponds to a pending pick-up order. If the customer identification module 418 determines that both of the requirements in steps 808 and 810 are met, then the customer identification module 418 can automatically check in the first vehicle for pick-up of the pending pick-up order at step 812. Alternatively, if the customer identification module 418 determines that either of the requirements in steps 808 and 810 are not met, then the customer identification module 418 can prompt, via the concierge tool 302, to manually check in the first vehicle for pick-up of the pending pick-up order at step 814. After the order is completed, the customer identification module 418 can receive a manual indication that the pick-up order is completed from a concierge tool 302 via the concierge tool interface 416.

Figure 9:
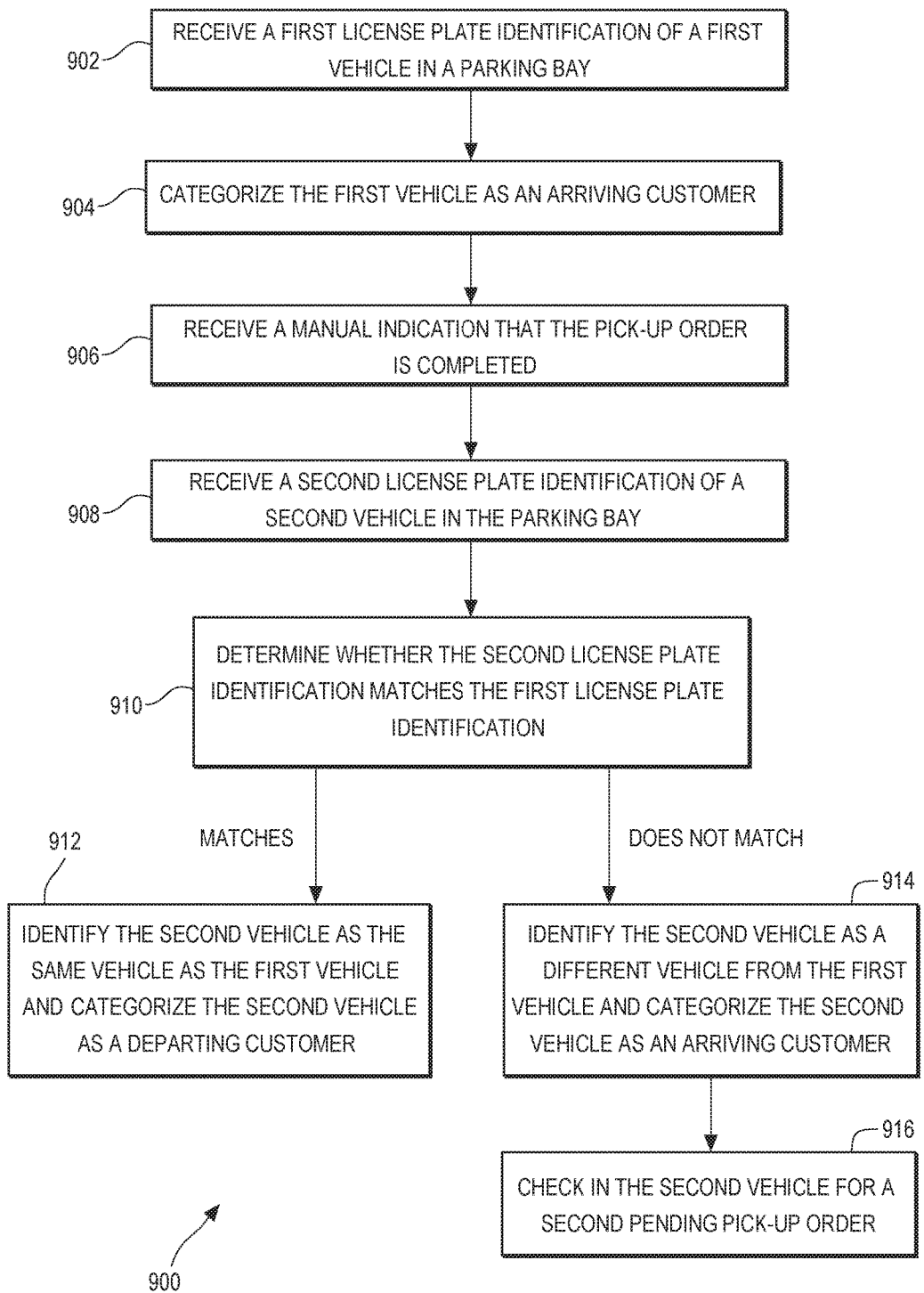
FIG. 9 is an example flow diagram of logic to determine whether a newly detected license plate corresponds to a newly arriving customer or a departing customer in accordance with various embodiments.

FIG. 9 shows an example flow diagram of logic 900 to determine whether a newly detected license plate corresponds to a newly arriving customer or a departing customer. At step 902, the customer identification module 418 receives, from the ALPR module 410, a first license plate identification of a first vehicle in a parking bay 102. At step 904, the first vehicle is categorized as an arriving customer. The first vehicle may then be checked in for a pending pick-up order. Checking in the first vehicle, categorized as an arriving customer, may include a manual check in (such as step 624 in FIG. 6) or an automatic check in by the system 400 (such as step 627 in FIG. 6). Upon completion of the pick-up order, the customer identification module 418 receives, from the concierge tool 302, a manual indication that the pick-up order is completed at step 906. After receiving the manual indication that the pick-up order is completed, the customer identification module 418 receives from the ALPR module 410 a second license plate identification of a second vehicle in the parking bay 102 at step 908. At step 910, the customer identification module 418 determines whether the second license plate identification matches the first license plate identification, which is the same as or similar to the process discussed with respect to step 606 in FIG. 6. If the customer identification module 418 determines the second license plate identification matches the first license plate identification, the customer identification module 418 identifies the second vehicle as being the same vehicle as the first vehicle and categorizes the second vehicle as a departing customer at step 912. If, however, the customer identification module 418 determines the second license plate identification does not match the first license plate identification, the customer identification module 418 identifies the second vehicle as a different vehicle from the first vehicle and categorizes the second vehicle as a new arriving customer at step 914. Optionally, at step 916, the system 400 checks in the second vehicle for a second pending pick-up order in response to categorizing the second vehicle as a new arriving vehicle. So configured, the system 400 can properly distinguish between departing customers and newly arriving customers.

Figure 10:
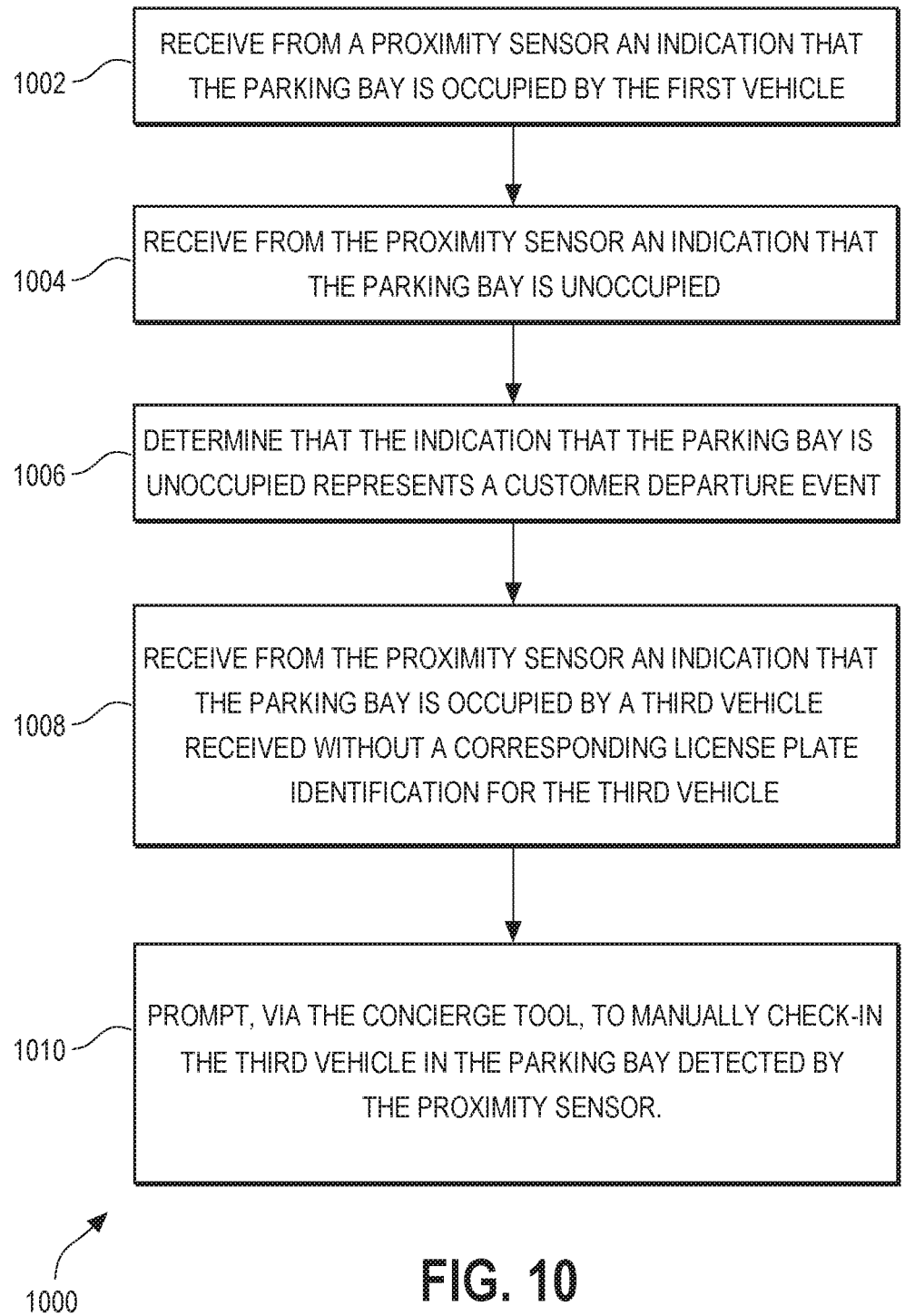
FIG. 10 is an example flow diagram of logic of a method to detect a departing customer and to detect a new arriving customer in accordance with various embodiments.

FIG. 10 shows an example flow diagram of logic 1000 of one method to detect a departing customer and to detect a new arriving customer using proximity sensor data. At step 1002, the customer identification module 418 (or the vehicle detection server 406) may receive from proximity interface module 412 (or proximity sensor interface circuitry) an indication that the parking bay is occupied by the first vehicle. The indication that the parking bay is occupied may be the set state for the proximity sensor when it is set to "present" in step 710 in FIG. 7. After checking out the first vehicle (e.g., in step 630), the customer identification module 418 (or the vehicle detection server 406) may receive from the proximity interface module 412 an indication that the parking bay is unoccupied or vacant at step 1004. The indication that the parking bay is vacant may be the set state for the proximity sensor when it is set to "non-present" in step 720 in FIG. 7. As a result, at step 1006, the customer identification module 418 (or the vehicle detection server 406) may determine that the indication that the parking bay is unoccupied represents a customer departure event (e.g., corresponding to 514 in FIG. 5).

In certain embodiments, the proximity sensors 114 can be used to sense a newly arriving customer. At step 1008, after receiving the manual indication that the pick-up order is completed, the customer identification module 418 (or the vehicle detection server 406) may receive from the proximity interface module 412 an indication that the parking bay is occupied by a third vehicle. This indication may be received without a corresponding license plate identification from the ALPR module 410 for the third vehicle. Thus, in this example, a new customer (third vehicle) has arrived and entered the parking bay 102, however, the ALPR module 410 has failed to detect a license plate, or has failed to detect a license plate with a high enough confidence level to exceed the confidence level threshold (see, step 602 in FIG. 6). However, the proximity detector indicates that a vehicle is present, thereby causing the concierge to be alerted or prompted, via the concierge tool 302, to manually check in the third vehicle in the parking bay detected by the proximity sensor for a pending pick-up order at step 1010.

Figure 11:
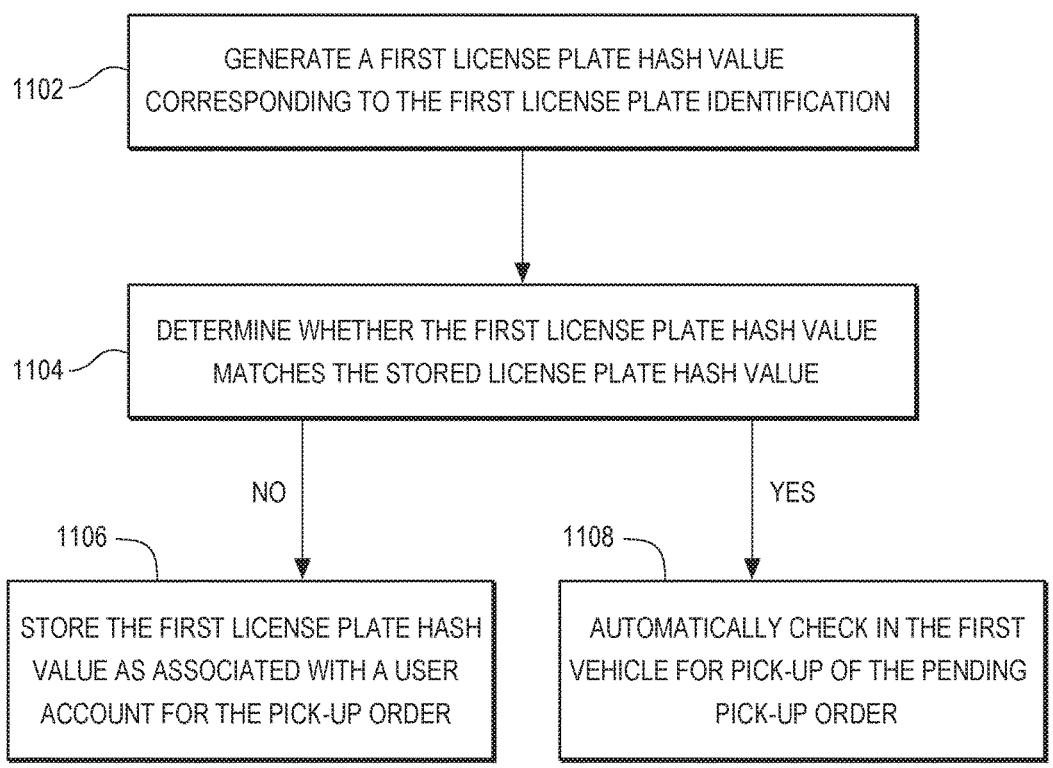
FIG. 11 is an example flow diagram of logic to utilize license plate hash values to preserve customer privacy in accordance with various embodiments.

FIG. 11 shows an example flow diagram of logic 1100 to utilize license plate hash values to preserve customer privacy, in accordance with various embodiments. At step 1102, the vehicle detection server 406 generates a first license plate hash value corresponding to the first license plate identification, for example, using a one-way hash algorithm. The stored license plate identifications in database 420 may also be license plate hash values that are associated with customers. At step 1104, the customer identification module 418 determines whether the first license plate hash value matches a stored license plate hash value. If no matching stored license plate hash value is found, the customer identification module 418 may store the first license plate hash value as associated with a user account for the pick-up order, for example, after a successful check out by the concierge. If a matching stored license plate hash value is found, the customer identification module 418 may proceed to automatically check in the first vehicle for pick-up of the pending pick-up order at step 1108. In some embodiments, if multiple license plate identifications are recognized for a customer, all of the hash values corresponding to those multiple license plate identifications may be stored as associated with a customer upon successful check out of that customer. Additional new license plate hash values may be stored for a returning customer, even if other license plate hash values are already associated with that customer. In this manner, a library or list of license plate identifications or license plate hash values can be created and continuously updated for a customer to include all potential license plate identifications or hash values that might represent that customer.

The above method steps are described with respect to execution by one or more of the elements illustrated in FIGS. 3 and 4. Although only one element may be mentioned with respect to execution of the above-mentioned steps, it is understood that other entities may execute the steps instead. For example, many steps that are discussed as being executed by the customer identification module 418 may be instead executed by the order processing module 414, the concierge tool interface 416, the vehicle detection server 406, the ALPR module 410, and/or the proximity interface module 412, or vice versa. Additionally, it is understood that the various elements in FIGS. 3 and 4 are configured to execute the above-mentioned method steps. As discussed above, the various elements may include system circuitry 306, such as programmed processors 308 and corresponding memory 310, that is programmed to execute instructions 312 such that the system circuitry 306 is configured to provide the above-mentioned functionality.

So configured, the system 400 and corresponding logical flows discussed above provide for synthesis and fusion of multiple disparate input data types to provide efficient and accurate vehicle detection and customer identification solutions. The described solutions and their variations can accommodate different input states to determine, with high accuracy, the identification of a customer as early as possible. In so doing, the system 400 can begin processing pick-up orders sooner to thereby reduce customer wait time and enhance the customer experience.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. One skilled in the art will realize that a virtually unlimited number of variations to the above descriptions are possible, and that the examples and the accompanying figures are merely to illustrate one or more examples of implementations. It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

Various implementations have been specifically described. However, many other implementations are also possible.

What is claimed is:

1. A method of identifying a vehicle in a parking bay, the method comprising:
    detecting, using a proximity sensor, a presence of a first vehicle within the parking bay;
    communicating proximity data from the proximity sensor to a processing device, the processing device communicatively coupled to the proximity sensor;
    determining, by the processing device, that the first vehicle is present within the parking bay;
    detecting, using a camera communicatively coupled to the processing device, a first license plate of the first vehicle within the parking bay;
    determining, by the processing device, a first candidate license plate identification of the first license plate;
    determining, by the processing device, whether the first candidate license plate identification matches a stored license plate identification;

determining, by the processing device, whether the first candidate license plate identification corresponds to a pending pick-up order;

automatically checking in the first vehicle, by the processing device, for pick-up of the pending pick-up order when the first candidate license plate identification matches the stored license plate identification and when the first candidate license plate identification corresponds to the pending pick-up order;

receiving, by the processing device, from a concierge tool communicatively coupled to the processing device, a manual input indicating that the pick-up order is completed, the concierge tool comprising an electronic device;

setting, by the processing device, a status of the first vehicle as a departing vehicle in response to receiving from the concierge tool the manual input that the pick-up order is completed; and after receiving the manual input indicating that the pick-up order is completed:
  detecting a second time, using the camera, the first license plate of the first vehicle;
  determining a second time, by the processing device, the first candidate license plate identification of the first license plate;
  determining, by the processing device, that the status of the first vehicle is a departing vehicle; and
  determining, by the processing device, to ignore the first candidate license plate identification.

2. The method of claim 1, further comprising:
prompting, by the concierge tool, to manually check in the first vehicle for pick-up of the pending pick-up order when the first candidate license plate identification does not match the stored license plate identification or when the first candidate license plate identification does not correspond to a pending pick-up order.

3. The method of claim 1, further comprising:
after receiving the manual input indicating that the pick-up order is completed, detecting, using the camera, a second license plate of a second vehicle within the parking bay;
determining, by the processing device, a second candidate license plate identification of the second license plate;
determining, by the processing device, that the second candidate license plate identification is different from the first candidate license plate identification; and
determining, by the processing device, that the second vehicle is an arriving customer.

4. The method of claim 1, further comprising:
after automatically checking in the first vehicle, receiving, by the processing device from the proximity sensor, an indication that the parking bay is unoccupied; and
determining, by the processing device, that the indication that the parking bay is unoccupied represents a customer departure event.

5. A method of identifying a vehicle in a parking bay, the method comprising:
receiving, by customer identification circuitry, from automatic license plate recognition (ALPR) circuitry coupled to a camera, at least a first license plate identification of a first vehicle in a parking bay, the camera capturing images of the parking bay;
categorizing, by the customer identification circuitry, the first vehicle as an arriving customer;
receiving, from a concierge tool comprising an electronic device communicatively coupled to the customer identification circuitry, a manual input indicating that a pick-up order corresponding to the first vehicle is completed;

after receiving the manual input that the pick-up order is completed:
  receiving a second time, by the customer identification circuitry from the ALPR circuitry, the first license plate identification of the first vehicle in the parking bay;
  categorizing, by the customer identification circuitry, the first vehicle as a departing customer; and
  determining, by the customer identification circuitry, to ignore the first license plate identification in response to categorizing the first vehicle as a departing customer.

6. The method of claim 5, further comprising:
determining, by the customer identification circuitry, that the first license plate identification matches a stored license plate identification;
determining, by the customer identification circuitry, that the stored license plate identification corresponds to the pending pick-up order; and
automatically checking in the first vehicle, by the customer identification circuitry, for the pending pick-up order in response to determining that the stored license plate identification corresponds to the pending pick-up order.

7. The method of claim 5, further comprising:
determining, by the customer identification circuitry, that the first license plate identification does not match a stored license plate identification; and
prompting, by the concierge tool, to manually check in the first vehicle for the pending pick-up order via input to the concierge tool.

8. The method of claim 6, further comprising:
generating a first license plate hash value corresponding to the first license plate identification, wherein the stored license plate identification comprises a stored license plate hash value; and
determining that the first license plate hash value matches the stored license plate hash value.

9. The method of claim 5, further comprising:
generating a first license plate hash value corresponding to the first license plate identification;
determining that the first license plate hash value does not match a stored license plate hash value; and
storing the first license plate hash value as associated with a user account for the pick-up order.

10. The method of claim 5, further comprising:
receiving, by the customer identification circuitry from proximity sensor interface circuitry coupled to a proximity sensor configured to detect a presence of a vehicle in the parking bay, an indication that the parking bay is occupied by the first vehicle;
after receiving the manual input that the pick-up order is completed:
receiving, by the customer identification circuitry from the proximity sensor interface circuitry, an indication that the parking bay is unoccupied; and
determining, by the customer identification circuitry, that the indication that the parking bay is unoccupied represents a customer departure event.

11. The method of claim 5, further comprising:
after receiving the manual indication that the pick-up order is completed:
receiving, by the customer identification circuitry from proximity sensor interface circuitry coupled to a proximity sensor configured to detect a presence of a vehicle in the parking bay, an indication that the parking bay is occupied by a second vehicle received without a corresponding license plate identification from the ALPR circuitry for the second vehicle; and prompting, by the concierge tool, to manually check in the second vehicle in the parking bay detected by the proximity sensor via input to the concierge tool.

12. A system for identifying a vehicle in a parking bay, the system comprising:
automatic license plate recognition (ALPR) circuitry;
a camera coupled to the automatic license plate recognition (ALPR) circuitry, the camera configured to:
capture an image of a vehicle in a parking bay; and
generate a license plate identification of the vehicle in the parking bay;
a concierge tool comprising an electronic device configured to receive inputs from a user; and
customer identification circuitry communicatively coupled to the ALPR circuitry and the concierge tool, the customer identification circuitry configured to:
receive, from the ALPR circuitry, a first license plate identification;
categorize a first vehicle corresponding to the first license plate identification as an arriving customer; and
receive, from the concierge tool, a manual input indicating that a pick-up order corresponding to the first vehicle is completed;
after receiving the manual indication that the pick-up order is completed:
receive a second time, from the ALPR circuitry, the first license plate identification of the first vehicle in the parking bay;
categorize the first vehicle as a departing vehicle; and
determine to ignore the first license plate identification in response to categorizing the first vehicle as a departing vehicle.

13. The system of claim 12, wherein the customer identification circuitry is further configured to:
determine that the first license plate identification matches a stored license plate identification;
determine that the stored license plate identification corresponds to the pending pick-up order; and
automatically check in the first vehicle for the pending pick-up order in response to determining that the stored license plate identification corresponds to the pending pick-up order.

14. The system of claim 12, wherein the customer identification circuitry is further configured to:
determine that the first license plate identification does not match a stored license plate identification; and
prompt the user, via the concierge tool, to manually check in the first vehicle for the pending pick-up order via input to the concierge tool.

15. The system of claim 13, wherein the stored license plate identification comprises a stored license plate hash value, and wherein the customer identification circuitry is further configured to:
generate a first license plate hash value corresponding to the first license plate identification; and
determine that the first license plate hash value matches the stored license plate hash value.

16. The system of claim 12, wherein the customer identification circuitry is further configured to:
generate a first license plate hash value corresponding to the first license plate identification;
determine that the first license plate hash value does not match a stored license plate hash value; and
store the first license plate hash value as associated with a user account for the pickup order.

17. The system of claim 12, further comprising:
proximity sensor interface circuitry coupled to a proximity sensor configured to detect a presence of a vehicle in the parking bay and generate an indication that the parking bay is occupied by a vehicle or that the parking bay is vacant;
wherein the customer identification circuitry is further configured to:
receive, from the proximity sensor interface circuitry, an indication that the parking bay is occupied by the first vehicle;
receive, from the proximity sensor interface circuitry, an indication that the parking bay is unoccupied after receiving the manual input that the pick-up order is completed; and
determine that the indication that the parking bay is unoccupied represents a customer departure event.

18. The system of claim 17, wherein the customer identification circuitry is further configured to:
after receiving the manual input that the pick-up order is completed:
receive, from the proximity sensor interface circuitry, an indication that the parking bay is occupied by a second vehicle without receiving a corresponding license plate identification from the ALPR circuitry for the second vehicle; and
prompt, via the concierge tool, to manually check in the second vehicle in the parking bay detected by the proximity sensor via input to the concierge tool.

* * * * *